United States Patent
Stephanson

(10) Patent No.: US 9,225,783 B2
(45) Date of Patent: Dec. 29, 2015

(54) SENSOR EVENT ASSESSOR INPUT/OUTPUT CONTROLLER

(71) Applicant: Cory J. Stephanson, La Selva Beach, CA (US)

(72) Inventor: Cory J. Stephanson, La Selva Beach, CA (US)

(*) Notice: Subject to any disclaimer, the term of this patent is extended or adjusted under 35 U.S.C. 154(b) by 0 days.

(21) Appl. No.: 14/489,257

(22) Filed: Sep. 17, 2014

(65) Prior Publication Data

US 2015/0003480 A1    Jan. 1, 2015

Related U.S. Application Data

(63) Continuation of application No. 13/335,403, filed on Dec. 22, 2011, now Pat. No. 8,902,936.

(51) Int. Cl.
| | |
|---|---|
| *G01N 27/72* | (2006.01) |
| *H04L 29/08* | (2006.01) |
| *G08C 15/02* | (2006.01) |
| *H04Q 9/00* | (2006.01) |
| *G01D 21/00* | (2006.01) |
| *G01D 21/02* | (2006.01) |
| *H04J 3/02* | (2006.01) |

(52) U.S. Cl.
CPC .............. *H04L 67/12* (2013.01); *G01D 21/00* (2013.01); *G01D 21/02* (2013.01); *G08C 15/02* (2013.01); *H04J 3/02* (2013.01); *H04Q 9/00* (2013.01); *H04Q 2209/40* (2013.01); *H04Q 2209/826* (2013.01)

(58) Field of Classification Search
CPC ....... H04N 21/2368; H04L 67/12; H04J 3/02; G01D 21/00; G01D 21/02; G08C 15/02; H04Q 9/00; H04Q 2209/40; H04Q 2209/826

USPC ......................................................... 370/537
See application file for complete search history.

(56) References Cited

U.S. PATENT DOCUMENTS

| | | |
|---|---|---|
| 5,714,681 A | 2/1998 | Furness et al. |
| 6,301,228 B1 | 10/2001 | Bordogna et al. |
| 6,856,272 B2 | 2/2005 | Levitan et al. |
| 7,319,321 B2 | 1/2008 | Murray et al. |
| 7,596,242 B2 | 9/2009 | Breed et al. |
| 7,657,358 B2 | 2/2010 | Baur et al. |
| 7,663,502 B2 | 2/2010 | Breed |
| 8,120,354 B2 | 2/2012 | Stephanson et al. |
| 8,145,382 B2 | 3/2012 | Baur et al. |
| 8,244,405 B2 | 8/2012 | Kao et al. |
| 8,497,760 B2 | 7/2013 | Whalen et al. |
| 8,738,184 B2 * | 5/2014 | Kao et al. ...................... 700/275 |
| 2004/0183712 A1 | 9/2004 | Levitan et al. |
| 2006/0004495 A1 | 1/2006 | Baur et al. |
| 2007/0013372 A1 | 1/2007 | Murray et al. |

(Continued)

FOREIGN PATENT DOCUMENTS

WO    2009/070711 A1    6/2009

*Primary Examiner* — Jay P Patel

(57) ABSTRACT

A sensor event assessor input/output controller is disclosed. In one embodiment, a multi-channel sensor input configuration provides two-way communication with a plurality of sensors, each of the plurality of sensors having its own channel. An electronic signal receiver receives electronic signals from one or more of the plurality of sensors at a pre-defined sample rate. A signal combiner bundles the electronic signals from one or more of the plurality of sensors into a single electronic signal. A single channel output is used to provide the single electronic signal to the sensor event assessor.

20 Claims, 6 Drawing Sheets

(56) References Cited

U.S. PATENT DOCUMENTS

| | | |
|---|---|---|
| 2007/0086624 A1 | 4/2007 | Breed et al. |
| 2007/0154063 A1 | 7/2007 | Breed |
| 2008/0318595 A1 | 12/2008 | Rofougaran |
| 2009/0125161 A1 | 5/2009 | Baur et al. |
| 2009/0182524 A1 | 7/2009 | Stephanson |
| 2009/0222142 A1 | 9/2009 | Kao et al. |
| 2009/0273340 A1 | 11/2009 | Stephanson et al. |
| 2010/0145578 A1 | 6/2010 | Baur et al. |
| 2011/0025455 A1 | 2/2011 | Whalen et al. |
| 2011/0051551 A1 * | 3/2011 | Tenghamn .............. 367/24 |
| 2011/0129063 A1 | 6/2011 | Bendahan |
| 2012/0057741 A1 | 3/2012 | Macklin et al. |
| 2012/0316810 A1 | 12/2012 | Syed et al. |
| 2014/0207286 A1 | 7/2014 | Wang et al. |

\* cited by examiner

600

```
Provides a multi-channel sensor input configuration to provide
two-way communication with a plurality of sensors, each of the
plurality of sensors having its own channel.
602
                            ↓
Receives electronic signals from one or more of the plurality of
sensors at a pre-defined sample rate.
604
                            ↓
Combines the electronic signals into a single electronic signal.
606
                            ↓
Provides the single electronic signal over a single channel
output to a sensor event assessor.
608
```

FIG. 6

SENSOR EVENT ASSESSOR INPUT/OUTPUT CONTROLLER

CROSS REFERENCE TO RELATED APPLICATIONS

This application is a continuation application of and claims priority to and benefit of co-pending U.S. patent application Ser. No. 13/335,403, filed on Dec. 22, 2011, entitled "Sensor Event Assessor Input/Output Controller," by Cory J. Stephanson; U.S. patent application Ser. No. 13/335,403 is hereby incorporated herein by reference in its entirety.

This application is related to co-pending U.S. patent application Ser. No. 13/335,335 filed on Dec. 22, 2011 entitled "Sensor Event Assessor," by Cory J. Stephanson.

This application is related to co-pending U.S. patent application Ser. No. 13/335,434 filed on Dec. 22, 2011 entitled "Sensor Event Assessor Training and Integration," by Cory J. Stephanson.

TECHNICAL FIELD

The field of the present invention relates to assessing a sensor detected event.

BACKGROUND

Presently, sensors are utilized for various tasks. Normally, training personnel in the proper methodology of using, calibrating and deploying sensor systems is a significant investment in time, training and cost. Moreover, if the sensors are miss-calibrated or improperly or incorrectly utilized, detection capabilities can become significantly reduced.

SUMMARY

A sensor event assessor input/output controller is disclosed. In one embodiment, a multi-channel sensor input configuration provides two-way communication with a plurality of sensors, each of the plurality of sensors having its own channel. An electronic signal receiver receives electronic signals from one or more of the plurality of sensors at a pre-defined sample rate. A signal combiner bundles the electronic signals from one or more of the plurality of sensors into a single electronic signal. A single channel output is used to provide the single electronic signal to the sensor event assessor.

DESCRIPTION OF THE DRAWINGS

FIG. 6 is a flowchart of a computer-implemented method for utilizing an input/output controller in conjunction with assessing a detected event shown in accordance with one embodiment of the present technology.

Figure 1:
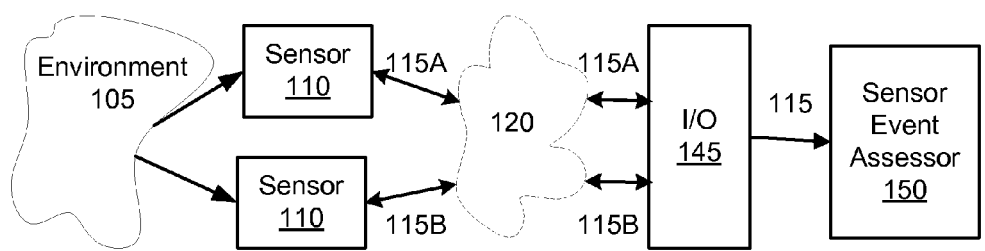
FIG. 1 is a block diagram of one embodiment of a sensor event assessor system shown in accordance with one embodiment of the present technology.

The drawings referred to in this description should be understood as not being drawn to scale except if specifically noted.

DETAILED DESCRIPTION

Reference will now be made in detail to embodiments of the present technology, examples of which are illustrated in the accompanying drawings. While the technology will be described in conjunction with various embodiments, it will be understood that they are not intended to limit the present technology to these embodiments. On the contrary, the presented technology is intended to cover alternatives, modifications and equivalents, which may be included within the spirit and scope the various embodiments as defined by the appended claims.

Furthermore, in the following detailed description, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Overview

One embodiment described herein provides an architecture that accurately determines inference and assessment information based on input provided by at least two sensors. One embodiment utilizes previously trained data when evaluating the sensors input to provide the inference and assessment information In one embodiment, the inference and assessment information can include event size information as well as geo-location information including position, velocity, height and the like. In so doing, intelligent event determination can be performed. In addition, the assessment information is provided in a user accessible format. In one embodiment, the information may be overlaid on real-time video for positive identification of the event. Thus, embodiments described herein can be utilized in a variety of static or dynamic environments including, but not limited to, high sensitivity areas, perimeters, entry control points and the like.

Additionally, in one embodiment the system may be trained to detect or reject/ignore specific items of interest. Moreover, the sensors and event assessor system self-calibrate after being introduced into an environment of operation. The post-introduction self-calibration process allows deployment in different environments with minimal testing, support or set-up time.

For example, the sensor event assessor system described herein is capable of combining the input from two or more magnetic sensors to detect and provide the location of ferromagnetic materials (guns, knives, shrapnel) whether on a specific individual or location, or on multiple individuals and locations.

In one embodiment the sensor event assessor system is portable, allowing easy setup for temporary detection and assessment. In another embodiment, the sensor event assessor system can be permanently installed for long term detection and assessment. In one embodiment, the sensor event assessor system described herein can be used in a multitude of entry controlled environments including, but not limited to, single entry doorways, guarded checkpoints, airports, sports stadiums, even open-air public spaces.

In another embodiment, the sensor event assessor system can be used in intelligent perimeter solutions such as, but not limited to fence lines, borders, restricted areas, protection level areas and the like.

Monitored Environment

With reference to FIG. 1, a block diagram 100 of one embodiment of a sensor event assessor system is shown. In one embodiment, FIG. 1 includes an environment 105, at least two sensors 110 which provide output signals 115A and 115B over the connection 120 which is received by input/output (I/O) controller 145 which receives the multi-channel output signals 115A and 115B and combines them into a single channel 115 that is passed to sensor event assessor 150. Although two output signals 115A and 115B are shown, the technology is not limited to only two sensors.

In general, environment 105 may be natural or built and is usually described utilizing a combination of atmosphere, climate and weather conditions. Example, environments may include, but are not limited to, desert, tundra, canopy, jungle, riverine, aquatic, littoral, savannah, marine, urban or the like.

In one embodiment, environment 105 is a localized area or portion of an environment, similar to an ecosystem. For example, in one embodiment the area represented by environment 105 may approximate the range of operation of sensors 110.

In one embodiment, environment 105 may be an outdoor area. However, in another embodiment, environment 105 may be an indoor area such as a room, a structure or the like. In yet another embodiment, environment 105 may be a combination of indoor and outdoor areas such as an outpost, or the like. Additionally, part or all of environment 105 may be dry, partially or completely submerged, partially or completely buried, and the like.

Usually, environment 105 will have certain specific characteristics which will need to be addressed during the calibration of sensors 110. For example, if sensor 110 is a chemical sniffer, depending upon the location, known or naturally occurring levels of chemicals may pre-exist. Similarly, if sensor 110 is a magnetic sensor, visual sensor, thermal sensor, millimeter wave sensor, ultrasound sensor, seismic sensor or the like, environmental differences would need to be addressed. In one embodiment, the environmental differences are discussed and dealt with in more detail in the description of FIG. 2.

However, the characteristics of a specific environment 105 may also change over time, such as due to changes in temperature, humidity, weather conditions and the like. For example, electric currents induced in the ionosphere near where the atmosphere is closest to the Sun have been known to cause daily alterations in an environments magnetic field.

Additionally, there may be other events that change the characteristics of an environment 105. Events that are not related to natural changes. These events may include an introduction or removal of metal including, but not limited to, a vehicle, a gun, knife, key, pen, or the like entering into or departing from environment 105.

Generally, natural changes in environment 105 occur over a relatively longer period of time than event induced changes. For example, a change in environment 105 due to temperature fluctuations will normally occur over a period of a few hours. In contrast, a person walking with a knife through environment 105 may cause the same level of change, but the change will occur over a period of seconds or minutes instead of hours.

In one embodiment, when sensors 110 identify a change in environment 105 due to an event, output signal 115 is generated. In one embodiment, sensors 110 utilizes a relative change methodology instead of explicit field strength values when monitor environment 105.

The output signals 115A and 115B are passed via connection 120. In general connection 120 may be a wired connection or a wireless connection. In one embodiment, connection 120 may be a connection such as, but not limited to, AM, FM, PCM, GPS, RS232, RS485, USB, firewire, infrared and fiber optic communication technologies.

Output signals 115A and 115B are received by I/O controller 145 which receives the multi-channel output signals 115A and 115B and combines them into a single channel 115 that is passed to sensor event assessor 150. The actions of the I/O controller 145 are described in more detail in FIGS. 3 and 6.

Figure 3:
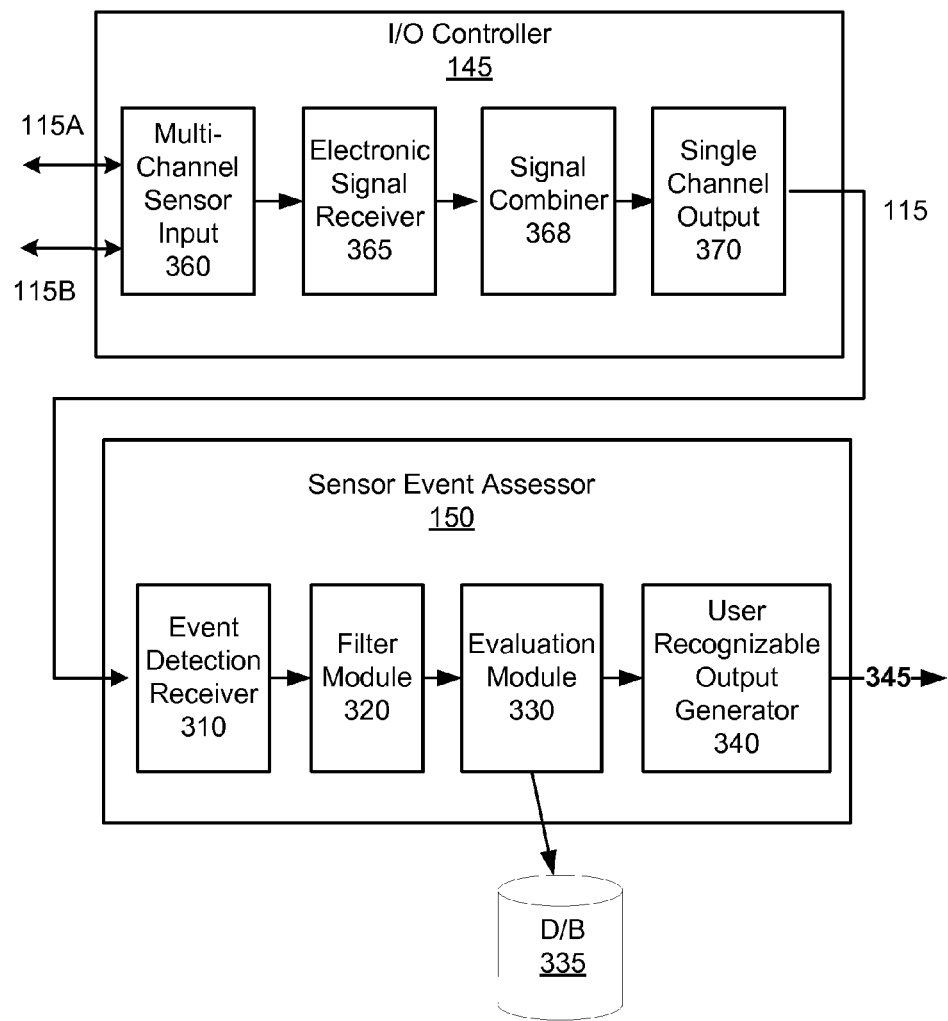
FIG. 3 is a block diagram of a sensor event assessor shown in accordance with one embodiment of the present technology.
Figure 4:
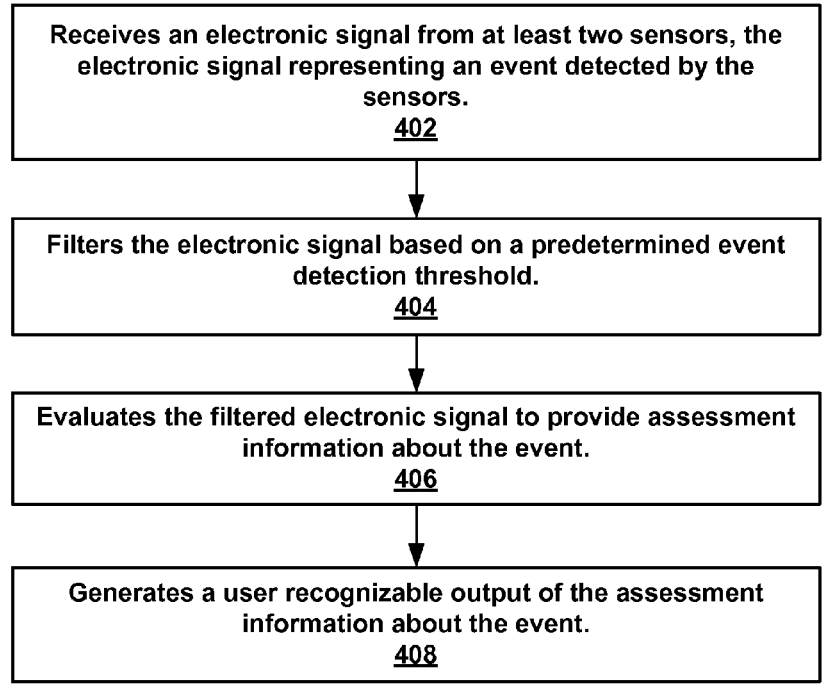
FIG. 4 is a flowchart of a computer-implemented method for assessing a detected event shown in accordance with one embodiment of the present technology.

Once sensor event assessor 150 receives the output signal 115 it may be filtered, evaluated, assessed and the like as described in more detail in FIGS. 3 and 4.

Environment Sensors

Figure 2:
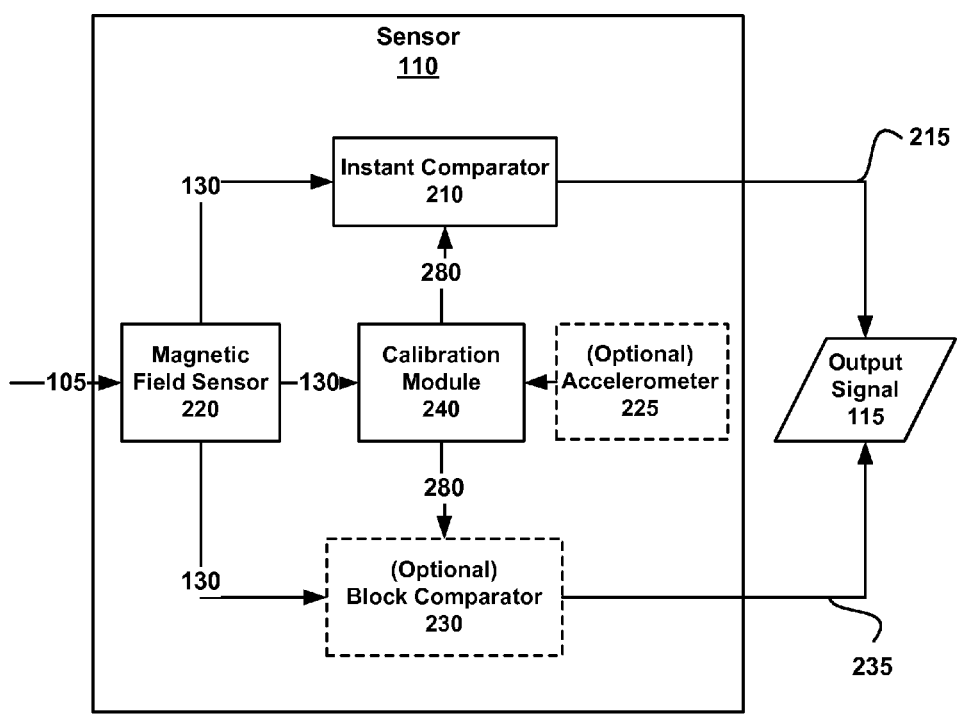
FIG. 2 is a block diagram of a sensor shown in accordance with one embodiment of the present technology.

With reference now to FIG. 2, a block diagram 200 of one of the at least two sensors 110 is shown in accordance with one embodiment. In one embodiment, sensor 110 includes magnetic field sensor 220, calibration module 240, and instant comparator 210. In one embodiment, magnetic field monitor 260 also includes an optional block comparator 230 and accelerometer 225. Magnetic field sensor 220 may be a flux gate magnetometer sensor, a super conducting quantitative interference detector (SQUID), a magneto resistive sensor, spin electron relaxation frame (SERF) sensor or the like.

Although a magnetic field sensor 220 is utilized in the following discussion, other sensor types, such as, a visual sensor, a thermal sensor, a millimeter wave sensor, an ultrasound sensor, a seismic sensor and the like may be similarly utilized. The use of a magnetic field sensor 220 herein is provided merely for purposes of clarity. Moreover, the technology is well suited to utilizing a plurality of the same type of sensors 110 or a combination of different types of sensors 110. By using two or more of the same type of sensors 110 additional positional accuracy and range can be obtained. By using a combination of different sensors 110 the types of assessment being performed can be expanded upon or further refined.

In one embodiment, magnetic field sensor 220 may comprise a strip of metal, thin film or the like that is sensitive to magnetic fields. When voltage is applied, magnetic field sensor 220 will provide an analog signal 130 such as a voltage, representative of the magnetic field of environment 105. For example, a change in the magnetic field of environment 105 will cause a change in the voltage of signal 130. In one embodiment, signal 130 is a relative value for a magnetic field and not an explicit magnetic field strength value.

Magnetic field sensor 220 samples environment 105 periodically at a pre-defined rate of time and generates a corresponding signal 130 for each sampling period. For example, magnetic field sensor 220 may use a 1 MHz crystal to establish a nanosecond sample rate. Magnetic field sensor 220 outputs signal 130 to instant comparator 210, calibration module 240 and optional block comparator 230.

Calibration module 240 receives signal 130 from magnetic field sensor 220 and generates a relative baseline signal 280. For example, after calibration module 240 receives an initial time periods worth of signals 130, calibration module 240 will average the signals 130 and generate a relative baseline signal 280. In other words, relative baseline signal 280 is similar to a calibration, recalibration, zero or baseline for the particular environment 105 being monitored. In one embodiment, relative baseline signal 280 is a relative value and not an explicit magnetic field strength value.

In one embodiment, calibration module 240 will generate a new relative baseline signal 280 at a consistent interval. For example, a new relative baseline signal 280 may be generated every few minutes, few seconds, few hours or the like. By adjusting the time of generation for relative baseline signal 280, both sensitivity and range of magnetic field monitor 260 may be adjusted. In one embodiment, calibration module 240 may also include a manual option to allow a user to generate a new relative baseline signal 280.

Calibration module 240 provides relative baseline signal 280 to instant comparator 210 and optional block comparator 230.

Referring still to FIG. 2, in one embodiment, instant comparator 210 performs a comparison between signal 130 and relative baseline signal 280 to recognize a change in environment 105. When the resultant difference between the magnetic field of environment 105 and relative baseline signal 280 is greater than or equal to a pre-defined difference threshold, instant comparator 210 provides an output signal 115.

In one embodiment, instant comparator 210 does not utilize an actual magnet field strength value as the threshold value but instead utilizes a threshold value related to the difference between signal 130 and relative baseline signal 280. Thus, in one embodiment, neither signal 130 nor relative baseline signal 280 need include a specific or quantified value for magnetic field 110 as long as magnetic field sensor 220 provides a consistent representation of magnetic field 110 in signal 130. However, in another embodiment, signal 130 and/or relative baseline signal 280 may include a specified value related to magnetic field 110.

For example, the threshold value is based on the absolute value of the difference between signal 130 and relative baseline signal 280. By utilizing the absolute value of the difference, instant comparator 210 is well suited to recognizing changes in magnetic field 110 that increase the field strength as well as changes in magnetic field 110 that reduce the field strength.

Optional block comparator 230 operates in a manner similar to instant comparator 210, but may be calibrated to recognize changes in magnetic field 110 over a greater time period than instant comparator 210. When the change over time for relative baseline signal 280 is greater than or equal to a pre-defined threshold, block comparator 230 provides an output signal 115.

In another embodiment, block comparator 230 may monitor a plurality of relative baseline signals 280 over time to detect changes in magnetic field 110 over time. In yet another embodiment, block comparator 230 does not utilize a difference between the pluralities of relative baseline signals 280 as the threshold. Instead, block comparator 230 utilizes a threshold value related to the area under the curve defined by the plurality of relative baseline signals 280. However, the functions described herein as being performed by optional block comparator 230 may be performed by either or both of instant comparator 210 and calibration module 240. However, for purposes of clarity, optional block comparator 230 is described herein as separate from instant comparator 210 and calibration module 240.

Optional accelerometer 225 is utilized to provide motion and orientation information to sensors 110. For example, if one or more of the sensors 110 were hanging from a tree, rolled across the ground, bumped, rotated, moved or the like, accelerometer 225 would provide orientation and motion information that would allow sensors 110 to maintain its calibration.

In another embodiment, if sensors 110 are rotating, accelerometer 225 will provide calibration module 240 with real time information about the orientation of magnetic field sensor 220. This information allows calibration module 240 to generate and maintain a plurality of distinct baseline signals 280 directly related to the orientation of magnetic field sensor 220 at the time signal 130 was generated (or received). Thus, calibration module 240 is able to provide both instant comparator 210 and block comparator 230 with the appropriate relative baseline signal 280 for each signal 130 received from magnetic field sensor 220. Thus, in one embodiment, any changes in orientation of magnetic field sensor 220 would be resolved at calibration module 240 prior to the operations of either instant comparator 210 or block comparator 230.

In one embodiment, accelerometer 225 is a component found outside of sensors 110. However, in another embodiment, such as shown in FIG. 2, accelerometer 225 may be located within sensors 110.

In one embodiment, sensors 110 wired or wirelessly transmits output signal 115 to sensor event assessor 150 by implementing a communication technology selected from a group of communication technologies, such as, but not limited to AM, FM, PCM, GPS, RS232, RS485, USB, firewire, infrared and fiber optic communication technologies. For example, if an analog output signal 115 is generated, the signal could be transmitted using AM or FM communication technologies in which the output signal is modulated with a carrier signal, and then electromagnetically communicated to sensor event assessor 150.

Sensors 110 and sensor event assessor 150 are capable of operation in both an attended state and an unattended state. For example, sensors 110 and sensor event assessor 150 are well suited to be placed in an environment that is constantly supervised, such as a checkpoint, chokepoint, or the like. In another embodiment, sensors 110 are able to be "dropped" into an area to act as a standalone environment monitor. For example, sensors 110 may be placed in a location such as a closed hallway, off-limits area, front yard, driveway, room exit, building exit, parking garage, perimeter, and the like. In one embodiment, during operation in an unmanned operating environment, output signal 115 from sensors 110 may be communicated to a remote site containing sensor event assessor 150.

As stated herein, sensors 110 and sensor event assessor 150 may be employed in desert, jungle, riverine, littoral and/or coastal regions. Furthermore, due to the self-calibrating characteristics, sensors 110 are also capable of operating under a wide range of physical conditions such as, high humidity, low humidity, extreme temperature ranges, dusty, dirty, sandy and muddy conditions, partially or completely submerged, partially or completely buried, and the like. For example, sensors 110 are capable of operating in environments with one or more significant physical conditions such as, but not limited to, tropical or arctic environments.

Additionally, sensors 110 are capable of operation in constantly changing environment such as a desert environment that may have daily or weekly environmental changes (e.g., temperatures that range from at or below freezing at night to 40 degrees Celsius midday). In another embodiment, sensors 110 are also well suited for operation in a controlled environment having little or no harsh physical conditions, such as an airport terminal, building, parking lot and the like.

In one embodiment, sensors 110 and sensor event assessor 150 are powered by means of an electrical power source. This electrical power source may comprise an internal power source, such as a system battery, or an external power source, such as a transmission line that delivers alternating current and that may be accessed through an electrical wall socket. Further, the sensors described herein may be small and portable, e.g., reduced power requirements possibly having a shorter range; larger vehicle deployed, e.g., increased power requirements, thereby increasing the range; or may be hard mounted, such as on or in a building or other structure. In one embodiment, sensors 110 and/or sensor event assessor 150 may be selectively powered up and selectively powered-down to extend battery life.

Sensors 110 may also be expanded to include data storage for various purposes. For instance, in an embodiment, signal 130, relative baseline signal 280 and/or information generated by instant comparator 210 and block comparator 230 is stored in a storage unit such that the data may be subsequently retrieved and further processed. For example, a hard disk drive (HDD) or random access memory (RAM) is used to electronically store the data by means of arrays of electronic capacitors that are configured to acquire an electronic charge, wherein the charging of the capacitor arrays corresponds to a digital representation of the acquired data. However, it is understood that the aforementioned examples are merely exemplary of different storage units that may be implemented pursuant to various embodiments of the present technology. Other suitable storage units may also be utilized to store data such that it may be later accessed and processed. For instance, a portable flash drive may be used to store data, and the flash drive could be physically transported from a first computing system to a second computing system, wherein both computing systems are capable of accessing data stored on the drive.

Additional details of an embodiment of sensor calibration that may be utilized in accordance with embodiments of the present invention is described in U.S. patent application Ser. No. 12/431,418, entitled "Self-Calibrating Magnetic Field Monitor," by Cory Stephanson et al., assigned to the assignee of the present patent application and incorporated as reference herein in its entirety.

Assessing a Detected Event

With reference now to FIG. 3, a block diagram of an I/O controller 145 and a sensor event assessor 150 is shown in accordance with one embodiment. Although in one embodiment I/O controller 145 is shown as distinct from sensor event assessor 150, in another embodiment, I/O controller 145 is located within a sensor event assessor 150.

In one embodiment, I/O controller 145 includes a multi-channel sensor input 360, an electronic signal receiver 365, a signal combiner 368 and a single channel output 370.

In one embodiment, multi-channel sensor input 360 provides two-way communication with the plurality of sensors 110, each of the plurality of sensors 110 having its own channel, such as 115A and 115B. Electronic signal receiver 365 receives electronic signals from one or more of the plurality of sensors 110 at a pre-defined sample rate. Signal combiner 368 bundles the electronic signals from one or more of the plurality of sensors 110 into a single electronic signal 115. Single channel output 370 provides the single electronic signal 115 to sensor event assessor 150.

For example, I/O controller 145 receives the multi-channel output signals 115A and 115B and combines them into a single channel 115 that is passed to sensor event assessor 150. Moreover, I/O controller 145 can also communicate with each of the sensors 110. For example, I/O controller 145 is capable of adjusting the sample rate of one or more of the sensors 110. In addition, I/O controller 145 can adjust the power consumption of one or more sensors 110. I/O controller may additionally monitor, organize, cascade, utilize and otherwise interact with each of sensors 110.

In one embodiment, I/O controller 145 may also automatically adjust the baseline settings of one or more of the sensors 110 in the network based on one or more other sensors 110. For example, if a rogue sensor is providing an output signal that is outside of the normal (with respect to other sensors 110 in the network), I/O controller 145 may provide a calibration update to the rogue sensor to the appropriate baseline. In so doing, a network wide baseline or calibration can be automatically achieved.

In one embodiment, sensor event assessor 150 receives output signal 115 from I/O controller 145 and provides assessment information 345 in a user accessible format.

In one embodiment, sensor event assessor 150 includes an event detection receiver 310, a filter module 320, an evaluation module 330 and a user recognizable output generator 340. Event detection receiver 310 receives an electronic output signal 115 related to an event detected by sensors 110 as described in detail in FIGS. 1 and 2.

Filter module 320 compares the electronic output signal 115 with a predetermined event detection threshold. In other words, the electronic output signal 115 is passed through filter module 320 if the electronic output signal 115 is greater than or equal to the predetermined event detection threshold.

In one embodiment, evaluation module 330 receives the electronic signal from filter module 320 and provides assessment information about the event. In one embodiment, the assessment information is based on previously trained information stored in a database 335. User recognizable output generator 340 provides the assessment information 345 about the event in a user recognizable format.

With reference now to FIG. 4, a flowchart 400 of a computer-implemented method for assessing a detected event is shown in accordance with one embodiment.

At 402 of FIG. 4, one embodiment receives an electronic output signal 115 from sensors 110 which represents an event in environment 105 detected by sensors 110. As stated herein, sensors 110 may be magnetic, seismic, acoustic, ultrasound, millimeter wave, thermal, chemical sniffers, micron wave, Radar/GPR, or the like. Moreover, sensors 110 may be passive or active or may be user selectable.

In one embodiment, by utilizing two or more sensors 110, sensor event assessor 150 would be able to determine additional information relating to an event, information such as speed, direction, velocity, etc. Moreover, one or more of the magnetic field sensors 110 may be set for different range and or sensitivity detection characteristics. In so doing, sensor event assessor 150 would be able to provide both long distance monitoring and shorter range, but more sensitive, event monitoring.

In another embodiment, two or more sensors 110 may be utilized in a networked configuration. The networked configuration may include sensors 110 monitoring overlapping areas of environment 105, monitoring adjacent environments 105, offset environments 105, or a combination thereof.

For example, a first sensor 110 may be placed in a first location and a second sensor 110 may be placed in a second location. In one embodiment, the first and the second sensors 110 may be monitoring overlapping environments 105. By comparing the electronic signals from two or more sensors 110, allows output signal 115 to include orientation information such as distance, speed, bearing, etc. of an event. For example, a person carrying a rifle through environment 105 would cause a change recognizable by two or more magnetic field sensors 220. By comparing the information from each of the sensors 110, a location, direction, speed of travel, or the like for the person carrying the rifle may be provided. Moreover, by networking a plurality of sensors 110, a much larger area may be monitored. For example, the magnetic field monitors 260 may be laid out in a web type pattern, over a large distance with overlapping fields, over a large distance without overlapping fields, in a corridor monitoring fashion, and the like.

With reference now to 404 of FIG. 4 and to FIGS. 1 and 3, one embodiment filters the electronic signal based on a predetermined event detection threshold. For example, sensors 110 may detect an amount of metal, a type of metal and the like and generate output signal 115. Filter module 320 receives output signal 115 and compares the amount of metal, metal type or other associated information to determine if output signal 115 is larger than a threshold level. In the following example, the event detection threshold is calibrated to approximately an output signal 115 that would be generated by an amount of metal contained in a fixed blade knife. Thus, if output signal 115 was generated for a set of car keys or some change in a pocket, the event detection threshold would not be met and output signal 115 would be filtered out of sensor event assessor 150. However, if output signal 115 was generated for a semi-automatic pistol, the event detection threshold would be surpassed and filter module 320 would provide output signal 115 to evaluation module 330.

In another embodiment, filter module 320 filters the electronic output signal 115 based on a predetermined location. For example, the electronic output signal 115 may be filtered out if the event is located outside an area of interest. For example, if sensors 110 are monitoring a perimeter such as a building, fence, or unmarked area, an event that occurs within the perimeter may be filtered out while an event that occurs outside the perimeter would pass through filter module 320 and be provided to evaluation module 330. In another embodiment, evaluation module 330 may be utilized to determine the location of the event with respect to the area of interest and whether or not the event should be reported.

Referring now to 406 of FIG. 4, one embodiment evaluates the filtered electronic signal to provide assessment information about the event. In one embodiment, the assessment information is based on previously trained information stored in a database 335.

With reference now to 408 of FIG. 4, one embodiment generates a user recognizable output of the assessment information 345 about the event.

In one embodiment, the assessment information 345 may be an audible mechanical and/or visual alarm configured to be heard by a human being. In another embodiment, the assessment will include acquiring an image of an approximate location of the event detected by sensors 110 at approximately the time the event was detected. The assessment information may then be provided in conjunction with still image or approximately real-time video at a user interface. In another embodiment, assessment information 345 may be sent via a communication network such as connection 120 to automatically notify designated personnel when an event is detected.

For example, in one embodiment, assessment information 345 may be wirelessly transmitted to a remote receiver by a communication technology selected from a group consisting of AM, FM, PCM, GPS, RS232, RS485, USB, firewire, infrared and fiber optic communication technologies.

In yet another embodiment, assessment information 345 may be received by another device that will carry out a follow-on task. For example, assessment information 345 could provide a turn-on signal for one or more lights, such a light located in the vicinity of the detected event. Additionally, assessment information 345 could include a signal to generate a notification of the detected event to a remote location. In one embodiment, assessment information 345 may initiate an automatic action to incapacitate an identified threat. For example, as in a building having doors and windows that may be electronically locked assessment information 345 may include a command to automatically lock one or more of the building's doors and windows.

Moreover, assessment information 345 may include directional information about the event. In one embodiment, direction may include distance, bearing, velocity, relative velocity, and the like. Similarly, if sensors 110 were remote, assessment information 345 may include a message having one or more attributes associated with the event, such as the location of the event, when the event was detected, contact information for certain persons of interest or directions for the recipient of the message.

Assessment information 345 may also incorporate an imaging and/or audio trigger. For example, in response to received assessment information 345, an imaging device may begin to capture images and/or video of the monitored environment 105. Similarly, in response to received assessment information 345, an audio device may begin to capture audio of the monitored environment 105. In one embodiment, assessment information 345 could incorporate any or all of the above.

Example Computing System

Figure 5:
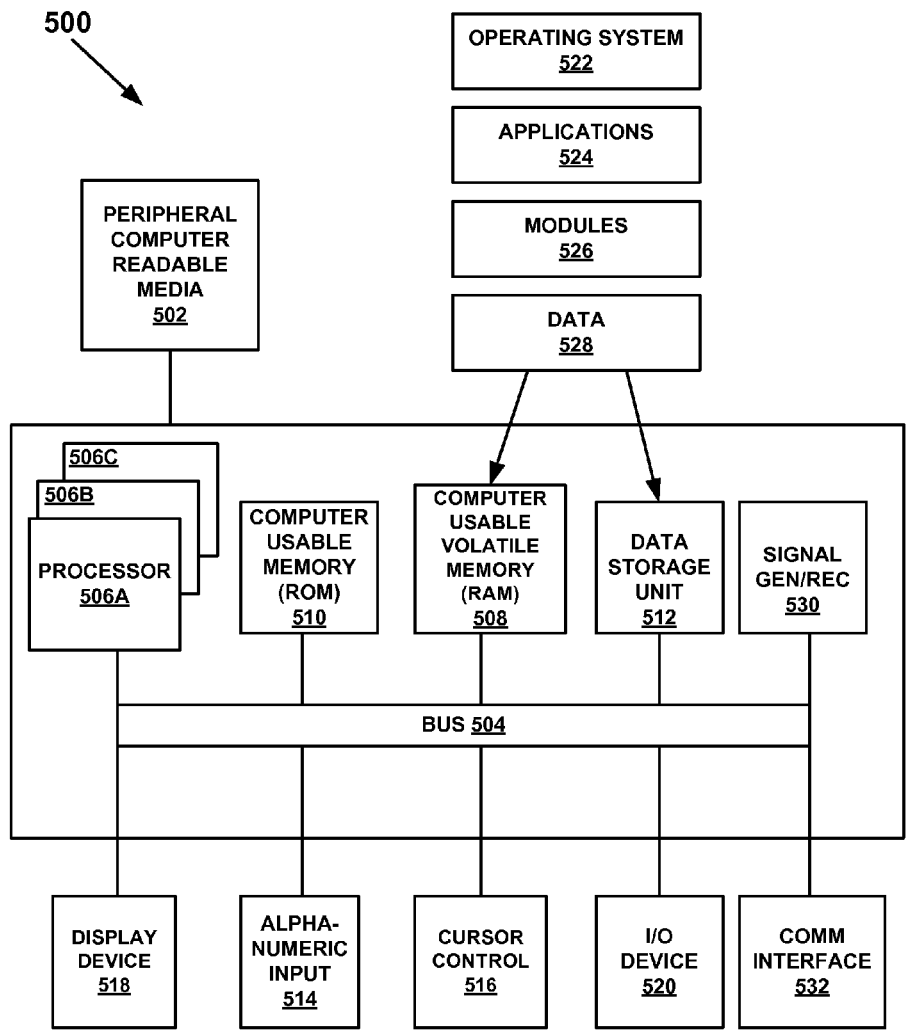
FIG. 5 is a block diagram of an exemplary computer system in accordance with one embodiment of the present technology.

With reference now to FIG. 5, portions of the technology for providing a communication composed of computer-readable and computer-executable instructions that reside, for example, in non-transitory computer-usable storage media of a computer system. That is, FIG. 5 illustrates one example of a type of computer that can be used to implement embodiments of the present technology. FIG. 5 represents a system or components that may be used in conjunction with aspects of the present technology. In one embodiment, some or all of the components of FIG. 1 or FIG. 3 may be combined with some or all of the components of FIG. 5 to practice the present technology.

FIG. 5 illustrates an example computer system 500 used in accordance with embodiments of the present technology. It is appreciated that system 500 of FIG. 5 is an example only and that the present technology can operate on or within a number of different computer systems including general purpose networked computer systems, embedded computer systems, routers, switches, server devices, user devices, various intermediate devices/artifacts, stand-alone computer systems, mobile phones, personal data assistants, televisions and the like. As shown in FIG. 5, computer system 500 of FIG. 5 is well adapted to having peripheral computer readable media 502 such as, for example, a floppy disk, a compact disc, and the like coupled thereto.

System 500 of FIG. 5 includes an address/data bus 504 for communicating information, and a processor 506A coupled to bus 504 for processing information and instructions. As depicted in FIG. 5, system 500 is also well suited to a multiprocessor environment in which a plurality of processors 506A, 506B, and 506C are present. Conversely, system 500 is also well suited to having a single processor such as, for example, processor 506A. Processors 506A, 506B, and 506C may be any of various types of microprocessors. System 500 also includes data storage features such as a computer usable volatile memory 508, e.g. random access memory (RAM), coupled to bus 504 for storing information and instructions for processors 506A, 506B, and 506C.

System 500 also includes computer usable non-volatile memory 510, e.g. read only memory (ROM), coupled to bus 504 for storing static information and instructions for processors 506A, 506B, and 506C. Also present in system 500 is a data storage unit 512 (e.g., a magnetic or optical disk and disk drive) coupled to bus 504 for storing information and instructions. System 500 also includes an optional alpha-numeric input device 514 including alphanumeric and function keys coupled to bus 504 for communicating information and command selections to processor 506A or processors 506A, 506B, and 506C. System 500 also includes an optional cursor control device 516 coupled to bus 504 for communicating user input information and command selections to processor 506A or processors 506A, 506B, and 506C. System 500 of the present embodiment also includes an optional display device 518 coupled to bus 504 for displaying information.

Referring still to FIG. 5, optional display device 518 of FIG. 5 may be a liquid crystal device, cathode ray tube, plasma display device or other display device suitable for creating graphic images and alpha-numeric characters recognizable to a user. Optional cursor control device 516 allows the computer user to dynamically signal the movement of a visible symbol (cursor) on a display screen of display device 518. Many implementations of cursor control device 516 are known in the art including a trackball, mouse, touch pad, joystick or special keys on alpha-numeric input device 514 capable of signaling movement of a given direction or manner of displacement. Alternatively, it will be appreciated that a cursor can be directed and/or activated via input from alpha-numeric input device 514 using special keys and key sequence commands.

System 500 is also well suited to having a cursor directed by other means such as, for example, voice commands. System 500 also includes an I/O device 520 for coupling system 500 with external entities. For example, in one embodiment, I/O device 520 is a modem for enabling wired or wireless communications between system 500 and an external network such as, but not limited to, the Internet. A more detailed discussion of the present technology is found below.

Referring still to FIG. 5, various other components are depicted for system 500. Specifically, when present, an operating system 522, applications 524, modules 526, and data 528 are shown as typically residing in one or some combination of computer usable volatile memory 508, e.g. random access memory (RAM), and data storage unit 512. However, it is appreciated that in some embodiments, operating system 522 may be stored in other locations such as on a network or on a flash drive; and that further, operating system 522 may be accessed from a remote location via, for example, a coupling to the internet. In one embodiment, the present technology, for example, is stored as an application 524 or module 526 in memory locations within RAM 508 and memory areas within data storage unit 512. The present technology may be applied to one or more elements of described system 500. For example, a method of modifying user interface 225A of device 115A may be applied to operating system 522, applications 524, modules 526, and/or data 528.

System 500 also includes one or more signal generating and receiving device(s) 530 coupled with bus 504 for enabling system 500 to interface with other electronic devices and computer systems. Signal generating and receiving device(s) 530 of the present embodiment may include wired serial adaptors, modems, and network adaptors, wireless modems, and wireless network adaptors, and other such communication technology. The signal generating and receiving device(s) 530 may work in conjunction with one or more communication interface(s) 532 for coupling information to and/or from system 500. Communication interface 532 may include a serial port, parallel port, Universal Serial Bus (USB), Ethernet port, antenna, or other input/output interface. Communication interface 532 may physically, electrically, optically, or wirelessly (e.g. via radio frequency) couple system 500 with another device, such as a cellular telephone, radio, or computer system.

The computing system 500 is only one example of a suitable computing environment and is not intended to suggest any limitation as to the scope of use or functionality of the present technology. Neither should the computing environment 500 be interpreted as having any dependency or requirement relating to any one or combination of components illustrated in the example computing system 500.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

I/O Controller

FIG. 6 is a flowchart 600 of a computer-implemented method for utilizing an input/output controller in conjunction with assessing a detected event as shown in accordance with one embodiment of the present technology.

With reference now to 602 of FIG. 6 and to FIG. 1, one embodiment provides a multi-channel sensor input configuration to provide two-way communication with a plurality of sensors, each of the plurality of sensors having its own channel. In one embodiment, the two-way communication is utilized by the I/O controller 145 to provide a command and control center for the plurality of sensors 110.

For example, I/O controller 145 can communicate with the sensors 110 to determine the power configuration for each of the sensors 110. The power configuration may include ac power, dc power, battery power, power remaining, power issues and the like. In so doing, I/O controller 145 can automatically develop a sensor power adjustment strategy based on the power configuration and can then communicate a sensor power adjustment to one or more of the plurality of sensors based on the sensor power adjustment strategy.

In addition, I/O controller 145 can periodically query each of the plurality of sensors 110 to confirm and or update power configurations. I/O controller 145 can then utilize the information to automatically update the sensor power adjustment strategy based on any sensor power changes.

In another embodiment, I/O controller 145 can communicate with the sensors 110 to determine the sensor type for each of the sensors 110. For example, the sensor type may be magnetic, seismic, acoustic, ultrasound, millimeter wave, thermal, chemical sniffers, micron wave, Radar/GPR, and the like. In addition, there may be more than one type of sensor within the plurality of sensors 110. Moreover, sensors 110 may be passive or active or may be user selectable. After determining the sensor types, I/O controller 145 can automatically develop a sensor organization strategy. In one embodiment, the sensor organization strategy includes developing a sensor hierarchy, establishing a sensor utilization strategy; and providing a sensor cascade provision for each of the plurality of sensors.

In one embodiment, I/O controller 145 provides the sensor organization information to each of the plurality of sensors 110. In addition, similar to the power configuration, I/O controller 145 may periodically query each of the plurality of sensors to confirm the sensor organization strategy. For example, I/O controller 145 may need to automatically update the sensor organization strategy as a sensor is added to or removed from the plurality of sensors 110.

Referring now to 604 of FIG. 6 and to FIG. 1, one embodiment receives electronic signals from one or more of said plurality of sensors at a pre-defined sample rate. In one embodiment, I/O controller 145 can communicate a sample rate adjustment to one or more of the plurality of sensors 110.

In addition, I/O controller 145 can determine a sensor baseline calibration "normal" from the electronic signals received from the plurality of sensors 110. In other words, since the sensors 110 include automatic calibration the electronic signal from the sensor will include a baseline for the calibration. However, if one of the sensors 110 has a calibration that is outside of the normal, I/O controller 145 can automatically provide the baseline calibration information to the sensor that is outside of the normal so that the sensor can adjust its calibration baseline accordingly.

With reference now to 606 of FIG. 6 and to FIG. 1, one embodiment combines the electronic signals into a single electronic signal. At 608 of FIG. 6 and to FIG. 1, one embodiment provides the single electronic signal over a single channel output to a sensor event assessor. In other words, I/O controller 145 receives the multi-channel output signals 115A and 115B and combines them into a single channel 115 that is passed to sensor event assessor 150.

It should be further understood that the examples and embodiments pertaining to the systems and methods disclosed herein are not meant to limit the possible implementations of the present technology. Further, although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for combining sensor output from a plurality of sensors to a single channel of sensor information for a sensor event assessor, the method comprising:
    providing a multi-channel sensor input configuration to provide two-way communication with a plurality of sensors, each of the plurality of sensors having its own channel;
    receiving electronic signals from one or more of the plurality of sensors at a pre-defined sample rate,
    combining the electronic signals into a single electronic signal; and
    providing the single electronic signal over a single channel output to a sensor event assessor.

2. The computer-implemented method of claim 1 further comprising:
    communicating a sample rate adjustment to one or more of the plurality of sensors.

3. The computer-implemented method of claim 1 further comprising:
    determining if one or more of the plurality of sensors is operating on battery power.

4. The computer-implemented method of claim 3 further comprising:
    automatically developing a sensor power adjustment strategy based on a battery power determination; and
    communicating a sensor power adjustment to one or more of the plurality of sensors based on the sensor power adjustment strategy.

5. The computer-implemented method of claim 4 further comprising:
    periodically querying each of the plurality of sensors to confirm sensor power; and
    automatically updating the sensor power adjustment strategy as sensor power changes.

6. The computer-implemented method of claim 1 further comprising:
    automatically querying each of the plurality of sensors to determine a sensor type; and
    automatically developing a sensor organization strategy based on the sensor type, the sensor organization strategy comprising:
        developing a sensor hierarchy;
        establishing a sensor utilization strategy; and
        providing a sensor cascade provision for each of the plurality of sensors.

7. The computer-implemented method of claim 6 further comprising:
    communicating a sensor organization to each of the plurality of sensors based on the sensor organization strategy.

8. The computer-implemented method of claim 6 further comprising:
    periodically querying each of the plurality of sensors to confirm the sensor organization strategy; and
    automatically updating the sensor organization strategy as a sensor is added to or removed from the plurality of sensors.

9. The computer-implemented method of claim 1 further comprising:
    determining a sensor baseline calibration normal from the electronic signals received from the plurality of sensors; and
    automatically providing the sensor baseline calibration normal to one or more of the plurality of sensors that are outside of the sensor baseline calibration normal.

10. A sensor input/output controller comprising:
    a multi-channel sensor input configuration to provide two-way communication with a plurality of sensors, each of the plurality of sensors having its own channel;
    an electronic signal receiver to receive electronic signals from one or more of the plurality of sensors at a pre-defined sample rate,
    a signal combiner to bundle the electronic signals from one or more of the plurality of sensors into a single electronic signal; and
    a single channel output to provide the single electronic signal to a sensor event assessor.

11. The sensor input/output controller of claim 10, wherein the electronic signals are received by the electronic signal receiver via a wired connection.

12. The sensor input/output controller of claim 10, wherein the electronic signals are wirelessly received by the electronic signal receiver via a communication technology selected from a group consisting of AM, FM, PCM, GPS, RS232, RS485, USB, firewire, infrared and fiber optic communication technologies.

13. The sensor input/output controller of claim 10 wherein the electronic signals include an event information selected from a group of event information electronic signals consisting of: size, position, direction and vector.

14. The sensor input/output controller of claim 10 further comprising:
    a sensor configuration manager comprising:
        a sensor type determiner;
        a sensor sample rate adjustor; and
        a sensor power manager.

15. The sensor input/output controller of claim 14 wherein the sensor configuration manager further comprises:
 a sensor organization strategy developer to establish a sensor utilization strategy and determine a sensor hierarchy.

16. The sensor input/output controller of claim 10 further comprising:
 a sensor baseline calibration module to determine a baseline from the electronic signals received from the plurality of sensors.

17. A non-transitory computer-usable medium comprising instructions, wherein the instructions when executed cause a computer system to perform a method for combining sensor output from a plurality of sensors to a single channel of sensor information for a sensor event assessor, the method comprising:
 providing a multi-channel sensor input configuration to provide two-way communication with a plurality of sensors, each of the plurality of sensors having its own channel;
 receiving electronic signals from one or more of the plurality of sensors at a pre-defined sample rate,
 combining the electronic signals into a single electronic signal; and
 providing the single electronic signal over a single channel output to a sensor event assessor.

18. The non-transitory computer-usable medium of claim 17 further comprising:
 determining power constraints for one or more of the plurality of sensors;
 determining sensor types for each of the plurality of sensors; and
 automatically enacting a sensor power adjustment strategy based on the sensor types and the power constraints.

19. The non-transitory computer-usable medium of claim 17 further comprising:
 determining a sensor baseline calibration normal from the electronic signals received from the plurality of sensors; and
 automatically providing the sensor baseline calibration normal to one or more of the plurality of sensors that are outside of the sensor baseline calibration normal.

20. The non-transitory computer-usable medium of claim 17 further comprising:
 receiving the electronic signal from the sensors in the group consisting of: a magnetic sensor, a chemical sniffer sensor, a millimeter wave sensor, an ultrasound sensor, a seismic sensor, and a laser tripwire.

* * * * *